March 20, 1973  A. E. GOLDFARB  3,721,035
VEHICLE LOADING TOY

Filed Feb. 24, 1971  2 Sheets-Sheet 1

INVENTOR.
ADOLPH E. GOLDFARB
BY

ROBERT M. ASHEN
ATTORNEY

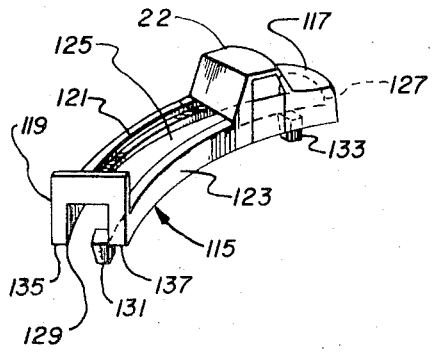
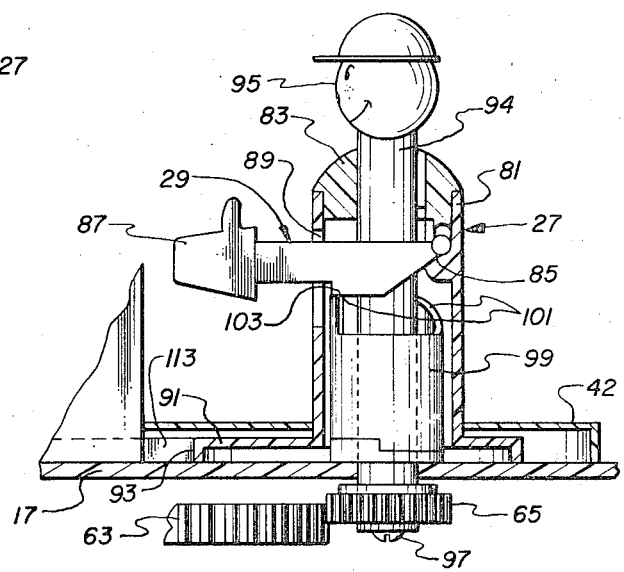
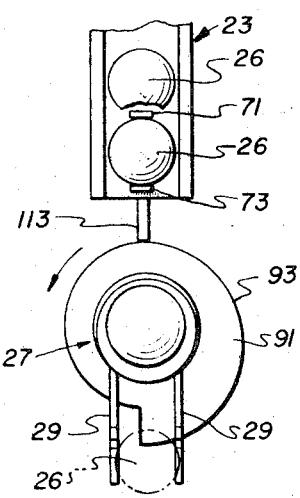
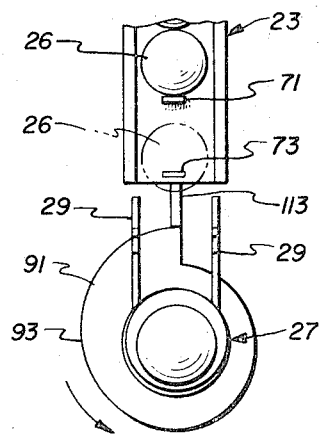

United States Patent Office 3,721,035
Patented Mar. 20, 1973

1

3,721,035
VEHICLE LOADING TOY
Adolph E. Goldfarb, 4614 Monarca Drive,
Tarzana, Calif. 91356
Filed Feb. 24, 1971, Ser. No. 118,391
Int. Cl. A63h 33/30
U.S. Cl. 46—40                                16 Claims

ABSTRACT OF THE DISCLOSURE

A toy comprising a track and a vehicle disposed on the track and driven along it by a drive means. At least one discrete object is carried by the vehicle and caused to be released therefrom at an unloading point on the track. A movable figure is positioned to receive the object after it has been unloaded from the vehicle, the figure further being capable of moving with the object and loading it onto the same or another vehicle at a loading point on the track. The aforegoing is performed in a continuous cycling operation of unloading and loading.

---

Young, pre-school aged children are particularly interested in playing with vehicles and often load and unload the vehicles during devised games. Further, children are interested in trains and other items that are run or driven on tracks. Particularly for very young children, there is a fascination in mechanical devices that embody the utilization of trucks, loading the trucks, or other similar vehicles, together with movement thereby on a track means. Thus, it is desirable if a child can, by simply turning a crank or operating another mechanism, cause the aforegoing to automatically occur, in an interesting or fascinating sequence. Thus, particularly for the preschooler, a device which comprises several different movements of mechanical parts including a vehicle moving on a track as well as movement of objects carried by the vehicle, through the use by a child of simple actuating means, is fascinating and interesting to the child.

The herein invention accomplishes the aforegoing by providing a loading and unloading toy where discrete objects are continuously loaded and unloaded off of a vehicle that moves about a track. The illustrated toy is comprised of a housing containing a mechanism for causing the desired interaction of the required parts exposed on the top surface of the housing. The top surface of the housing is preferably slanted, having one portion higher than the other, and has a circular track extending generally about its periphery. Thus, the track will traverse the surface of the housing from a lower point to an upper point and back down again. A toy vehicle, such as a truck, can be disposed on the track. Means is provided in the track for engaging the truck and moving it along the track. The mechanism can be actuated by a hand crank disposed on the housing. The vehicle is constructed to carry separate discrete objects such as balls or marbles. At an upper portion of the track there is means provided for unloading the objects from the vehicle as it passes that portion of the track. The objects are thereby delivered to a transfer means where they are temporarily stored. When the unloaded vehicle continues along the track to a lower point thereon, means is provided to raise it slightly off the track so that it will disengage from the driving means and be at a rest position. A rotatable figure is disposed adjacent the transfer means between the transfer means and the lower portion of the track where the vehicle is at rest awaiting loading. The figure receives objects from the transfer means and then rotates with the held object to deliver it to the vehicle. The action of the rotatable figure is synchronized with movement of the vehicle and the operation of the transfer means so that it will receive one discrete object at a time from the transfer means and deliver the objects one at a time to the vehicle. The figure continues rotating until all the objects are loaded on the vehicle. After all the objects are loaded on the vehicle, the vehicle is driven along the track back to the unloading point and the operation described above repeats. The loading and unloading is thus a continuous operation. It is believed that the invention will be further understood from the following detailed description and drawings in which:

FIG. 3 is an enlarged partial cross-sectional view of a figure and associated mechanism utilized in the toy of FIG. 1.

FIG. 4 is a schematic top view of the ball transfer means and of the figure in position for receiving a ball.

FIG. 5 is a schematic top view like FIG. 4 wherein the figure is rotated to deliver the ball to the waiting vehicle.

FIG. 6 is a pictorial view of a typical vehicle.

Figure 1:
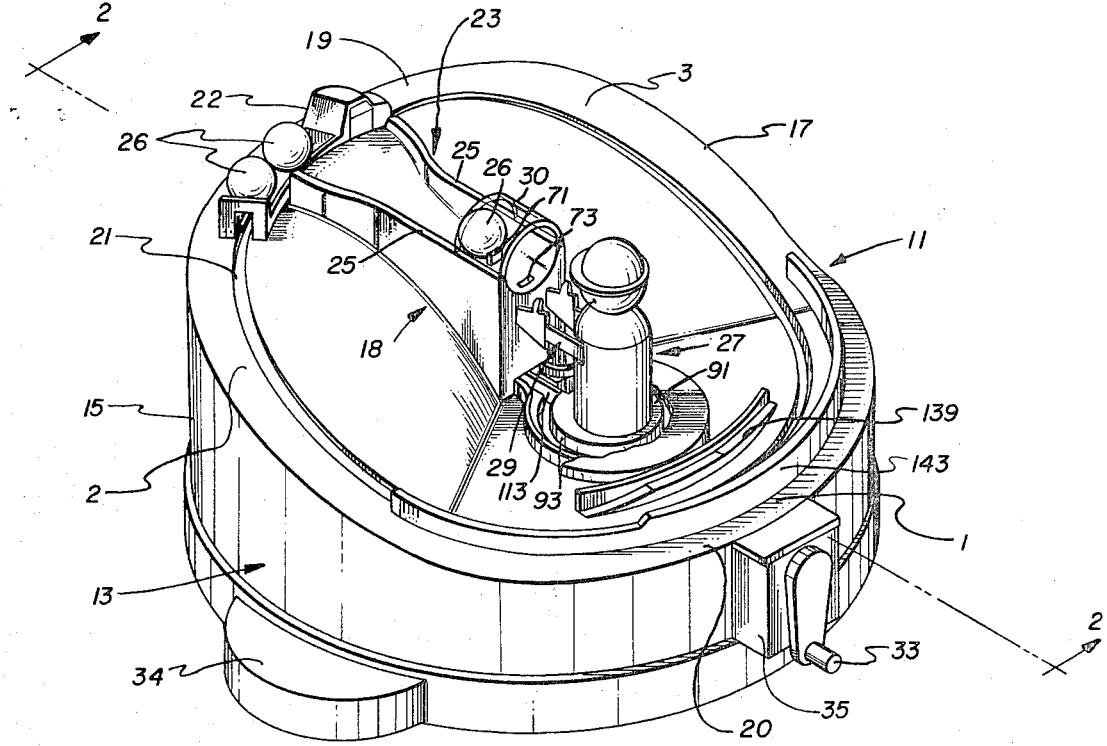
FIG. 1 is a perspective view of a preferred embodiment of the toy of this invention.
Figure 2:
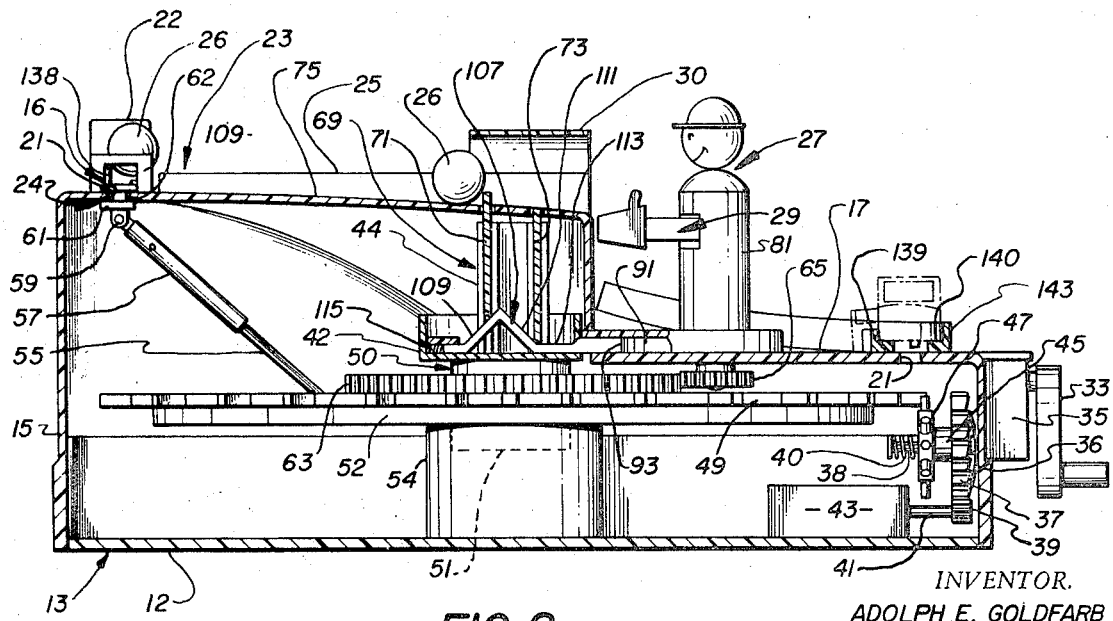
FIG. 2 is a cross sectional view taken along line 2—2 of FIG. 1.

Turning now to FIGS. 1 and 2, there is seen the toy 11 which is a preferred embodiment of the invention. The toy 11 comprises a hollow housing 13 having a generally cylindrical side wall 15, a top wall 17 and a bottom wall 12. The top wall 17 of the housing 13 is slanted from an upper end 19 to a lower end 20. A continuous loop track 21 is provided adjacent the periphery of the top wall 17. A vehicle 22 which carries discrete objects such as balls 26 is driven around the track by a drive means 24. Additionally, on the top wall and adjacent its upper end 19, there is provided an unloading means 16 for unloading the balls from the vehicle at an unloading position and a transfer means 18 which includes a chute 23 to receive the balls unloaded from the vehicle. Adjacent the lower end of the chute 23 a movable figure 27 is supported on the top wall 17. The figure 27 has outwardly extending arms 29 for receiving a ball 26 from chute 23. FIG. 1 shows the figure positioned to receive a ball from the chute. The figure 27 then rotates approximately 180° from the position shown in FIG. 1, and deposits the ball on the same or another vehicle 22 parked at a loading position on the track at the wall lower end 20.

The housing 13 is further provided with a hand crank 33 adjacent the lower end 20 which serves to operate the mechanism of the toy. This causes the vehicle to move around the track to the elevated unloading position, to unload the objects 26 onto the chute 23, and to move to the lower loading position. Concurrently, the transfer means 18 and the figure 27 are operated to deliver one ball at a time from the chute 23 to the figure, which in turn delivers them to the vehicle (or another vehicle 22 parked at a loading position on the track at the is loaded, it is then moved along the track back to the unloading position. The toy thus operates in a continuous cycle.

Looking at FIG. 2 particularly, it is seen that the crank 33 drives a reduction gear train 35 in housing 13. When turning the crank with one hand, the other hand can hold the toy in place by exerting pressure on a portion 34 extending from the side of the housing 13. The gear train 35 rotates a gear 37 through a one-way clutch arrangement which prevents the child from damaging the mechanism if he turns the crank in reverse. In particular, the gear 37 is fixed to a hollow shaft 45 that also has a spoke gear 47 fixed to it. The shaft 45 and gears 37 and 47 are rotatably and shiftably mounted as a unit on a horizontal axle 38 and are biased toward the gear 37 by a spring 40 on the inner end of the axle. The output from the gear train 35 is to a drive element 36, and the portions of the gear 37 engageable with the drive element are so formed that when the drive element rotates in one direction, it will rotate the gear 37, while when the drive element is rotated in the opposite direction it will slide relative to the gear 37 as permitted by the biasing spring 40. Gear 37 drives a small gear 39 which rotates shaft 41 of a music box 43 to provide a tune. Spoke gear 47 drives a large gear 49 mounted normally thereto. Large gear 49 is rotatably mounted on a vertical axle 50 disposed at the center of the device. This axle 50 also serves as a center support post for the central portion of the structure within the track. The illustrated axle 50 includes a cylindrical top portion 51 secured to and depending from the underside of a central housing section 42 supported on the top wall 17. Axle 50 further includes a larger diameter cylindrical bottom portion 54 mounted on bottom wall 12 and extending upwardly to receive the lower end of upper portion 51 in a matching receptacle in its upper end. A horizontally extending circular support platform 52 carried on the upper end of lower portion 54 provides support for gear 49. Large gear 49 serves as the main driving force for the vehicle 22 that travels along the track 21. Connected to the gear 49 is a rod 55 which telescopes in a cylindrical sleeve 57. The sleeve 57 in turn is pivotally connected at its outer end 59 to the bottom of a drive member 61 which is supported for movement along the track 21. The drive member 61 is adapted to engage the vehicle 22 to move it along the track. Since the rod 55 is affixed to gear 49 at a fixed height, and the height of the track varies, the combined length of the arm formed by rod 55 and sleeve 57 must be permitted to vary, and this is achieved by the telescoped connection between rod 55 and sleeve 57. The illustrated track 21 is in the form of a continuous slot in the top wall 17. The drive member 61 is in the form of two small generally rectangular plates separated by a midsection 62 to form an I-shape in vertical section. As shown in FIG. 2, the drive member 61 is received in the slot of the track.

Additionally, coaxially mounted on the same vertical axle 50 as the gear 49 and secured to gear 49 for common rotation, is a gear 63. The gear 63 in turn drives a small gear 65 that serves to operate the figure 27 as well as a ball release mechanism 69 for the transfer means 18.

As can be seen from FIG. 3 particularly, figure 27 is comprised of a cylindrical outer housing 81 having an enclosed top portion 83. Two arms 29 are pivotally mounted at their inner ends (by means of a pivot pin 85 to which they are both fixed) to the inside of housing 81. The outer ends 87 of the arms 29 may be in the shape of large gloves or hands and an enlarged opening 89 is provided in the housing 81 through which the arms 29 extend. The outer housing 81 terminates at its lower end in an irregularly shaped base portion 91 which defines an outer cam surface 93 particularly seen in FIGS. 4 and 5.

As shown best in FIG. 2, the base portion 91 is disposed in one end of the central housing section 42. Section 42 also houses the ball release mechanism 69, including the stop plates 71 and 73, the shiftable cam 107 and the biasing spring 115. An upright portion 44 of the housing section 42 to one side of the cam 107 provides vertical guide slots in which the stop plates 71 and 73 vertically move. A vertical post 94 extends through the center of the housing 81 and has a head 95 mounted on its exposed upper end. The lower end of the post 94 is fixedly connected to the small gear 65 as by means of a screw 97, for common rotation. Post 94 is preferably either integrally formed with or rigidly connected to the enclosed upper portion 83 of the housing 81 such that rotation of the post 94 by gear 65 effects like rotation of the housing 81 and the arms 29. Fixed to the top wall 17 and extending upwardly within the cylindrical housing 81 is a tubular cam 99 having an upwardly directed annular cam surface 101 at its upper end that engages a lower surface 103 of one of the arms 29. In the illustrated device, the other arm 29 is not in contact with the cam surface 101 but rather is fixedly connected through the pivot pin 85 to the first arm so that both arms will move up and down in unison about the pivot. The figure 27 is shown in a ball receiving position in FIGS. 3 and 4, wherein the arms 29 are in a general horizontal position with surface 103 riding on an elevated portion of the cam surface 101. When the figure is rotated by gear 65 to the ball delivering position shown in FIG. 5, facing the vehicle 22, the arm surface 103 will ride down to a lower portion of the cam surface 101, and the arms 29 will lower to release a held object onto the vehicle.

The ball release mechanism 69 contains two vertical slidable stop plates 71 and 73 which move upwardly from the bottom surface 75 of the chute 23, serving to both retain the balls 26 and releasing them to the figure 27 in a manner to be further described with particular regard to FIGS. 2–5.

The stop plates 71 and 73 operate cooperatively to release one ball 26 at a time to the arms 29 of the FIG. 27. As shown in FIG. 2, below the plates 71 and 73, there is disposed an inverted V-shaped cam 107 having cam side surfaces 109 and 111. An extension 113 extends horizontally from side surface 111 into contact with the cam surface 93 which rotates with the FIG. 27. The inverted V-shaped cam 107 is biased by means of a spring 115 so as to be always forced in a direction toward the cam surface 93 and in contact therewith. The plates 71 and 73 are freely slidable up and down and rest upon the cam side surfaces 109 and 111. As a result, rearward plate 71 is moved up and down by cam side surface 109, while the forward plate 73 is moved up and down by cam side surface 111. The cam 107 is positioned relative to the plates 71 and 73 such that as one plate is raised the other is lowered and vice versa, Thus, as shown in FIGS. 2 and 4, when figure 27 faces the chute 23, cam surface 93 moves the cam 107 to a rearward position away from the figure, and rear plate 71 is thereby raised above chute surface 75 by cam surface 109 to prevent passage of a ball 26. When cam 107 reaches this rearward position as shown in FIG. 2, the forward plate 73 is lowered so that its upper end does not protrude above the surface 75 and passage of a ball is permitted.

When the figure 27 rotates counterclockwise to a position facing away from the chute 23 as shown in FIG. 5, the cam 107 is moved by the cam surface 93 of the figure to a forward position toward the figure and rear plate 71 is lowered on cam surface 109 so that its upper end does not protrude above surface 75. This permits passage of a ball past rear plate 71. At the same time, the forward plate 73 is raised to stop passage of a ball, Thus, as plates 73 and 71 alternately raise and lower, a ball rolling down the chute would first be stopped by rear plate 71 and then permitted to roll past plate 71 but be stopped by front plate 73. Finally, the ball will be permitted to roll past front plate 73 to reach the figure. When more than one ball is on the surface 75 of the chute, the plates 71 and 73 operate to deliver one at a time. In other words, when rear plate 71 lowers to let the first ball pass, front plate 73 is raised to retain it. By the time front plate 73 has lowered to let that first ball pass, rear plate 71 has come up again to retain a second ball. Then rear plate 71 lowers to release the second ball and front plate raises to retain it. From plate 73 then lowers to deliver the second ball while rear plate is raised to retain a third ball and so on. The illustrated plates 71 and 73 are spaced apart a distance about equal to the diameter of the ball.

A vehicle 22 is shown in FIG. 6. The vehicle 22 has a front end 117 and a rear end 119. It is further comprised of two side walls 121 and 123 with an opening 125 therebetween in which the balls 26 can rest and be seated. The vehicle is provided with an opening 127 at the forward end 117 and a like opening 129 at the rear end 119. The openings 127 and 129 communicate with the central opening 125. A tabular portion 131 extends downwardly at the rear end 119. The portion 131 is secured to side wall 123 and positioned to that side of the opening 129. A like tabular portion 133 is provided at the front end 117. Portion 133 is also secured to side wall 123 and is positioned to that side of opening 127. The vehicle 22 is slightly curved along its walls 121 and 123 to conform with the radius of the track. It will be noted that a continuous open path, following the curvature of the track, is provided the length of the vehicle running along the inside of the side wall 121.

In utilizing the toy, the vehicle 22 is placed on the track with the tabular portions 131 and 133 extending through the track slot 21 and with the bottom edges 135 and 137 of the side walls 121 and 123 resting on the top wall 17 of the housing adjacent the track slot 21. Thus, the bottom edges 135 and 137 serve as the bearing surfaces for the vehicle as it moves along the track. In the operation of the toy, the drive means 61 pushes against the tabular portion 133 at the front of the vehicle to move the vehicle along the track. At the top end 19 of wall 17, adjacent to and outwardly of the track, a vertically extending projection or wall 138 is fixed to the housing top wall 17. The projection 138 is positioned to pass through the continuous open path formed by the front opening 127, the central opening 125 and the rear opening 129 as the vehicle is moved along the track past the projection 138. The projection 138 thereby engages any balls 26 being carried in the vehicle and causes them to be rolled off the opposite or inner side of the vehicle onto the chute as shown in FIG. 2. Thus, the projection 138 and the openings 125, 127 and 129 comprise the unloading means 16 of the illustrated toy.

When the vehicle 22 reaches the wall lower end 20 it is stopped for loading. The vehicle initially encounters ramps 139 and 140 provided at either side of the track slot 21, as shown best in FIGS. 1 and 2. The ramps 139 and 140 are generally aligned with the track slot 21. Thus, the bottom edges 135 and 137 at the front of the vehicle first encounter the ramps 139 and 140, respectively. The front portion of the vehicle is thereby lifted off the track sufficient for the drive member 61 to clear the front tabular portion 133 and continue on its movement around the track, without engagement with the vehicle. This leaves the vehicle at rest in a loading position with its front end elevated. The ramps, vehicle and drive member 61 are so proportioned that the vehicle is stopped with the forward end of the central opening 125 coaligned with the figure 27. When a ball is dropped from the arms 29 of the figure onto the inclined vehicle, the ball will roll to the lower rear end of the vehicle to make room for additional balls.

The mechanism is so arranged that when the vehicle 22 is on the ramps 139 and 140, the figure 27 with a ball 26 rotates to face the vehicle and the arm surface 103 moves to a lower portion of the annular cam surface 101. This permits the arms 29, by virtue of their own weight and the weight of the ball, to lower sufficiently to release the ball therefrom onto the vehicle. As the figure 27 rotates back away from the vehicle, the arm surface 103 moves toward a higher portion of the annular cam surface 101, which causes the arms 29 to raise to a starting position, as seen in FIG. 3, where they are ready to receive another ball.

As the figure 27 rotates, the plates 71 and 73 alternately rise and lower to release one ball at a time at the proper interval into the arms 29 of the figure. As shown in this embodiment, three balls may be utilized and the gearing arrangement and relationships are thus provided to accommodate the placement of the three balls. The figure 27 will thus rotate and deposit the three balls as the drive member 61 makes one rotation about the track from the ramps 139, 140. When the drive member 61 returns to the ramps, all three balls have been deposited onto the vehicle which has its front end up on the ramps. The drive member 61 will then engage the downwardly extending rear tabular portion 131 which is still in a lowered position in the path of the drive member. The vehicle 22 will be pushed forward along the track so that the rear end of the vehicle is raised on the ramps, which allows the drive member 61 to pass under the rear tabular portion 131. By this time, the front end of the vehicle has been lowered off the ramps sufficiently to lower the front tabular portion 133 back to the track for engagement by the drive member 61. Though one vehicle is shown, two or more vehicles can be linked together in a train-like manner. Additionally, more than one separate vehicle can be used, with one vehicle unloading while another is loaded as will be further pointed out.

As can be appreciated, the gearing relationships determine the proper timing for the figure to receive the ball and then rotate to deliver it into the waiting vehicle. If a Geneva-type gear system is used, the figure 27 could be made to be stationary during the unloading and movement of the vehicle, and not cause to rotate until the vehicle was in the loading position. In the toy as shown, the figure 27 continually rotates. The gearing in the toy shown is such that the figure 27 rotates three times while the larger gear 49 and drive member 61 rotates once. Thus, with three balls 31, the figure rotates three times as the vehicle makes one complete turn of the track 21.

The track can be divided in thirds, with three stations indicated as 1, 2 and 3 on FIG. 1. Station 1 is at the ramps 139 and 140. Thus, the arms 29 of the figure are facing a vehicle on the ramps after having just loaded a third ball thereon. As the vehicle progresses one third of the distance around the track to station 2, the figure makes one complete rotation. Since no balls are in the transfer means, the figure arms are empty. The transfer means 18 is halfway between stations 2 and 3. Thus, when the balls are forced off the vehicle by projection 138, they are retained by the rear plate 71 which is in a raised position. At this point, the figure 27 has made half a revolution and is facing the chute 23. This is due to surface 93 on the base of the figure forcing cam 107 rearwardly causing the plate 71 to rise. When the vehicle reaches station 3, the figure has made another revolution and its arms 29 are again facing the ramps. While the figure so rotates from the chute to the ramps, the cam surface 93 allows the cam 107 to move toward the figure, lowering rear plate 71 but raising front plate 73 to retain the balls on the chute. Thus, all the balls will be retained by the front plate 73 at this point when the vehicle is at station 3. As the vehicle is moved from station 3 to the ramps or station 1, the figure makes one complete rotation, this time receiving the first ball from the transfer means. In this connnection, as shown in FIG. 3, rear plate 71 is raised to retain the second and third balls as the front plate 73 is lowered sufficiently to let the first ball pass. Thus, the first ball is delivered to the arms of the figure. As the figure completes this rotation with the first ball to face the vehicle which has been stopped on the ramps, its arms are lowered to allow the ball to roll therefrom onto the vehicle. Now the driving means 61 disengages from the vehicle, and by the time it has moved up the track without the vehicle to station 2, the figure has made one complete rotation and dropped a second ball onto the vehicle. By the time the driving means has reached station 3, the figure has made another complete rotation and dropped the third ball onto the vehicle. The driving means returns to station 1 and picks up the vehicle again, during which time the figure has made another complete rotation (without any ball) and the overall cycle begins again. As can be seen, the figure will make three rotations without the ball during the continuous operation of the toy. Thus, two vehicles and six balls can be used to provide for the figure to be continually receiving a ball from the chute and delivering it to a waiting vehicle. The chute 23 may be provided with raised side retaining walls 25 and a tubular exit section 30 at its lower end to maintain and guide the balls along the chute. A retaining rail 143 may also be provided around the lower portion of the track to aid in maintaining the vehicle moving along the track.

What is claimed is:

1. A toy comprising:
   a track means,
   means for moving a carrier piece along the track means,
   transfer means for receiving at least one object carried on a carrier piece and unloaded therefrom at a first point along the track means,
   and a separate means for loading objects from said transfer means onto a carrier piece at a second different point along the track means.

2. The toy of claim 1 further comprising:
   manually operable means operatively connected to said means for moving a carrier piece to said transfer means and to said loading means for effecting coordinated operation of all of said means at a selected rate.

3. The toy of claim 1 wherein:
   said track is sloped such that said first point is above said second point thereon.

4. The toy of claim 3 wherein said transfer means comprises:
   a chute means disposed adjacent a portion of said track for receiving objects at the first point on said track,
   said chute having means for retaining a plurality of objects and then controllably releasing one object at a time therefrom.

5. The toy of claim 4 wherein said means for loading objects comprises:
   a movable element disposed adjacent said chute, between said chute and the second point on said track.

6. The toy of claim 5 wherein:
   said movable element has means for receiving an object from said chute and carrying the object to said second point on said track.

7. The toy of claim 6 wherein:
   said movable element has means for releasing a carried object therefrom at said second point.

8. The toy of claim 7 further comprising:
   means for rotating said movable element about a fixed vertical axis from a position to receive an object to a position for delivery of the object.

9. The toy of claim 8 wherein:
   said means for rotating said movable element actuates said means on said chute for controllably releasing one object at a time.

10. The toy of claim 8 wherein:
    said means for rotating said movable element actuates said means on said movable element for releasing a carried object therefrom.

11. A toy comprising:
    a housing having a top surface,
    a carrier piece disposed on said surface,
    means for moving said carrier on said surface,
    means on said housing for receiving objects carried on said carrier piece and unloaded therefrom at a first point on said housing,
    and a separate means on said housing for loading objects from said receiving means onto a carrier piece at a second different point on said housing.

12. The toy of claim 11 wherein:
    said top surface has a track formed thereon in the form of a continuous aperture band.

13. The toy of claim 12 wherein:
    said carrier piece is an elongated body having a front and rear end with downwardly extending tabular portions adjacent each end, said portions slidably engageable with said track.

14. The toy of claim 11 further comprising:
    means disposed on said surface at said first point for cooperatively acting with said carrier piece to cause objects carried thereon to be unloaded therefrom.

15. The toy of claim 11 wherein:
    said carrier piece is an elongated body having a base portion for carrying objects, said base having a slot therethrough whereby objects carried on the piece partially extend into the slot,
    and a vertical wall disposed adjacent said first point on said housing, said wall engageable with the slot by passing therethrough, whereby when the carrier piece is moved past the wall, said wall causes objects carrier on the carrier piece to be forced off the piece to said receiving means.

16. The toy of claim 11 further comprising:
    means on said housing for stopping said carrier piece at said second point for a period of time sufficient to permit said carrier piece to be loaded with objects and said means then allowing said carrier piece to proceed on said housing to said second point.

References Cited

UNITED STATES PATENTS

| | | | |
|---|---|---|---|
| 3,019,556 | 2/1962 | Frisbie | 46—40 X |
| 2,846,815 | 8/1958 | Smith | 46—40 X |
| 2,844,911 | 7/1958 | Smith et al. | 46—245 X |
| 1,620,912 | 3/1927 | Okel | 46—119 X |
| 2,933,854 | 4/1960 | Crosman | 46—119 X |

LOUIS G. MANCENE, Primary Examiner

D. L. WEINHOLD, Assistant Examiner